United States Patent
Leung et al.

[11] Patent Number: 5,395,860
[45] Date of Patent: Mar. 7, 1995

[54] FLEXIBLE POLYURETHANE FOAMS USING CHLORINATED ALKANES

[75] Inventors: Siusun K. Leung, Leedon Court, Singapore; Frank E. Critchfield, South Charleston; Paul M. Westfall, St. Albans, both of W. Va.

[73] Assignee: Arco Chemical Technology, L.P., Greenville, Del.

[21] Appl. No.: 173,717

[22] Filed: Dec. 23, 1993

Related U.S. Application Data

[63] Continuation-in-part of Ser. No. 930,879, Aug. 14, 1992, abandoned.

[51] Int. Cl.⁶ ............................................. C08G 18/04
[52] U.S. Cl. ........................................ 521/132; 521/137
[58] Field of Search ............................... 521/132, 137

[56] References Cited

U.S. PATENT DOCUMENTS

| | | | |
|---|---|---|---|
| 3,876,571 | 4/1975 | Cobbledick et al. | 260/2.5 AJ |
| 3,884,849 | 5/1975 | Molbert | 260/2.5 BB |
| 3,925,266 | 12/1975 | Fabris et al. | 521/126 |
| 3,931,062 | 1/1976 | Cobbledick | 260/2.5 AC |
| 3,978,011 | 8/1976 | Molbert | 260/2.6 AJ |
| 4,246,360 | 1/1981 | Brown | 521/108 |
| 4,458,036 | 7/1984 | Fesman | 521/128 |
| 4,698,369 | 10/1987 | Bell | 521/99 |
| 4,818,775 | 4/1989 | Teumac et al. | 521/122 |

*Primary Examiner*—Morton Foelak
*Attorney, Agent, or Firm*—David L. Mossman; Dennis M. Kozak

[57] ABSTRACT

It has been discovered that particular flexible polyurethane foam formulations having a chlorinated alkane incorporated therein have the advantage of improved combustion resistance, but also unexpectedly the additional advantages of improved durability (dynamic fatigue), and better processing in terms of a delayed onset of gel. These results were surprisingly achieved with the use of a chlorinated alkane as the sole component to improve combustion resistance. Incorporation of as much as 34 parts of chlorinated alkane per hundred parts of polyol have been accomplished.

32 Claims, 1 Drawing Sheet

Delay in Onset of Gel of Flexible Polyurethane Foams Employing Chlorinated Alkanes

FLEXIBLE POLYURETHANE FOAMS USING CHLORINATED ALKANES

This is a continuation-in-part of application Ser. No. 07/930,879, filed on Aug. 14, 1992, now abandoned.

FIELD OF THE INVENTION

The invention relates to flexible polyurethane foam formulations, and in one aspect more particularly concerns flexible high resiliency (HR) formulations for flexible polyurethane foams which have improved durability (dynamic fatigue), delayed gel and improved combustion resistance by incorporating a chlorinated alkane.

BACKGROUND OF THE INVENTION

Polyurethane foams, formed by the reaction of a polyisocyanate with a polyhydroxyl-containing compound in the presence of a suitable catalyst, are widely accepted as padding materials for cushions in furniture, automobiles and the like. Such foams typically burn readily, and considerable effort has been devoted to reducing the combustibility of the foams. One technique by which this may be done is through the use of additives to the foam that retard its flammability or help to extinguish the burning foam should it ignite. Known flame retardant additives include 2,3-dibromo-1,4-butenediol; tris(2-chloroethyl)phosphate and triethylphosphate, for example. However, a disadvantage of using the phosphate-containing additives is that often relatively large quantities of the expensive materials must be used, higher than about 1%. Additionally, phosphorus and halogen-containing flame retardants create a plasticizing effect which causes the polyurethane foam to be reduced in hardness, lower in compressive strength and increased in density so that the foam is detrimentally affected. Ideally, the load bearing properties of the foams, such as ILD—indentation load deflection and CFD—compression force deflection, should not be adversely affected by the presence of the additive. These conventional flame retardants are also somewhat volatile and may evaporate out of the polyurethane foam over time, thus decreasing the available fire retardancy. Finally, there are indications that these materials may be corrosive to certain metals on which the foams are applied.

Considerable research has been conducted on combustion resistant additives for polyurethane foams. For example, melamine has been used alone or together with conventional phosphate flame retardants. It is further well known to use polyvinyl chloride resins and related materials in polyurethane compositions as flame retardants either alone or in conjunction with materials such as antimony trioxide and antimony pentoxide. Zinc oxide (ZnO) and antimony trioxide ($Sb_2O_3$) have also been used together for this purpose. Random bromostyrene-containing copolymers have also been mentioned as improving fire retardancy when used in conjunction with the metal oxides mentioned above and others.

In low density, flexible and semiflexible polyether urethane foams containing chlorine-containing polymers such as polyvinyl chloride, zinc oxide and antimony oxide, part of the chlorine-containing polymer can be replaced with a chlorinated paraffin provided a proportionate reduction is made in the amount of zinc oxide employed, according to U.S. Pat. No. 3,876,571. Such foams must still retain some finely divided, solid chlorine-containing polymeric resin, such as polyvinyl chloride (PVC), antimony trioxide and zinc oxide.

U.S. Pat. No. 3,931,062 to Cobbledick teaches that when a minor amount of an oxide, hydroxide or basic salt of certain metals from Group 2a of the Periodic Table is introduced into a formulation for low density flexible and semiflexible hot-molded flame-retardant polyether-urethane foam compositions which also contain finely-divided solid chlorine-containing polymeric resins, zinc oxide (ZnO) and antimony trioxide ($Sb_2O_3$), and optionally a chlorinated paraffin, the resulting foams can be prepared commercially with good reproducibility and good stream stability. It is noted, however, that chlorinated paraffins are never used in the Examples therein, and that PVC, ZnO and $Sb_2O_3$ are still required components.

Discoloration occurring during commercial production of large buns or slabs of low density, flexible and semiflexible polyether urethane foams containing chlorine-containing polymers such as PVC, zinc oxide and antimony oxide is addressed in U.S. Pat. Nos. 3,884,849 and 3,978,011. This discoloration is reduced or prevented by using a small amount of a zinc salt of an organic monocarboxylic acid or an organic mono dithiocarbamic acid having from 1 to 25 carbon atoms in each acid moiety of the salt. It was noted as an aside that optionally part of the chlorine-containing polymer could be replaced with a chlorinated paraffin provided a proportionate reduction is made in the amount of the zinc oxide employed. None of the Examples in these patents employed a chlorinated paraffin to demonstrate the concept.

Nonetheless, flammability of polyurethane foams continues to be an important issue, and improvements in this area are always sought after. While additives are useful in this regard, as noted, many must be used in such large quantities that the resulting foam characteristics are degraded. It would be an improvement in the art if a foam additive could be discovered which not only imparts combustion resistance to the foam, and which not only does not degrade the foam physical characteristics, but which may actually improve those characteristics.

SUMMARY OF THE INVENTION

Accordingly, it is an object of the present invention to provide a process for the manufacture of flexible polyurethane foams which improves combustion resistance and improves durability, i.e. dynamic fatigue.

It is another object of the present invention to develop a foam formulation with delayed reactivity to allow flowability of the mixed reactants without affecting the gel characteristics of the foam.

Still another object of the present invention is to provide a flexible polyurethane formulation that results in improved combustion resistance using only one additive, instead of a complex collection of various compounds and synergists.

A unique composition that can be used for combustion resistant (CR) flexible polyurethane foams has been discovered. The polyurethane formulations found to the useful in this invention employ chlorinated alkanes as the sole additive to enhance combustion resistance. Thus, any undesirable effects caused by employing other additives such as chlorinated polymers, antimony trioxide, zinc oxide and the like are avoided since these materials are specifically excluded. Surprisingly, these inventive foams have been found to have improved durability (dynamic fatigue) and better processing (delayed gel) as well, as compared with similar formulations not incorporating the chlorinated alkanes. Other desirable foam properties are not affected adversely. In carrying out these and other objects of the invention, there is provided, in one form, a process for the manufacture of a flexible polyurethane foam comprising reacting together: (a) a polyol; (b) water; (c) an organic polyisocyanate; (d) at least one catalyst for the reaction of the polyether polyol and water with the organic polyisocyanate; and (e) a chlorinated alkane as the sole additive with any combustion resistance capability. A stabilizer (f) may be optionally present.

DETAILED DESCRIPTION OF THE INVENTION

Figure 1:
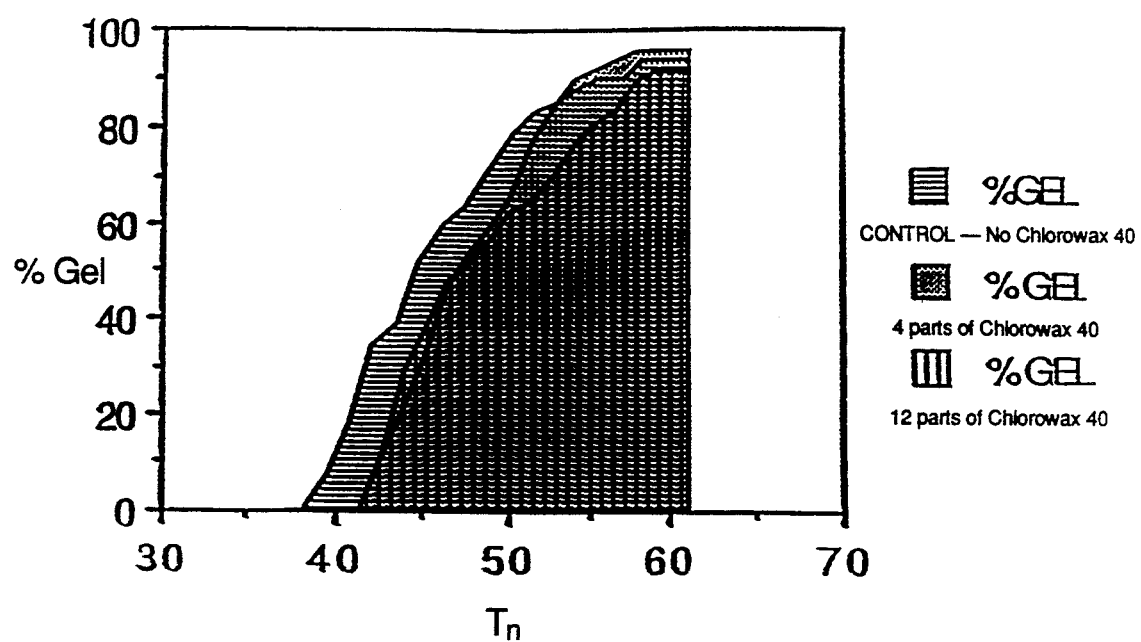
FIG. 1 is a chart showing the onset of gel of flexible polyurethane foams using various proportions of a chlorinated alkane, namely Chlorowax ® 40, demonstrating that the onset of gel is delayed (from 38 seconds to about 41 seconds) when chlorinated alkanes are employed, and that the rate of gel, as indicated by the slopes of the curves is approximately the same using the chlorinated alkanes.

It has been discovered that flexible polyurethane foams having improved combustion resistance (CR) may be made employing a chlorinated alkane as the sole additive to impart improved combustion resistance. That is, no other CR additive is to be used such as PVC resins, chlorinated PVC resins, melamine, antimony oxides, zinc oxides and the like. By using only one additive, the possibility of other desirable foam properties being adversely affected are greatly reduced. It should be noted that this prohibition against other CR additives does not prohibit the use of other components, such as a polyol or polymer polyol containing halogens e.g.; such components are not considered additives, but rather essential components. Surprisingly, the use of only chlorinated alkanes not only does not adversely affect polyurethane foam physical properties, durability, measured as Dynamic Fatigue, is actually improved. In some cases, improved compression and wet sets were also noted. Also unexpected was a delay in the onset of gel which noticeably improved the moldability or processing without affecting the final gel time significantly. Vinyl and fabric staining, fogging and heat aging tests have also all showed positive results for these formulations.

The flexible polyurethane foam is made by reacting together: (a) a polyol; (b) water; (c) an organic polyisocyanate; (d) at least one catalyst for the reaction of the polyether polyol with the organic polyisocyanate; and (e) a chlorinated alkane as the sole additive with any combustion resistance capability. Optionally, the formulation may include (f) a foam stabilizer which may be a surfactant, etc.

Polyol

The polyol, or blends thereof, employed herein depends upon the end use of the polyurethane foam to be produced. The molecular weight and hydroxyl number of the polyol is selected so as to result in flexible foams when the polyol is convened to a polyurethane.

In one embodiment of the present invention the polyol is characterized by having at least 70%, preferably at least 75%, and most preferably at least 85%, primary hydroxyl groups as measured by ASTM D-4273. This means that 70 mole % of the hydroxyl groups present are primary. The hydroxyl number of the polyol employed can accordingly vary over a wide range. In general, the hydroxyl number of the polyol employed may range from about 20 (or lower) to about 70 (and higher). As a further refinement, the specific foam application will likewise influence the choice of the polyol. As an example, for the flexible foams anticipated by this invention, the hydroxyl number of the polyol may be on the order of about 20 to about 70.

The hydroxyl number limits described above are not intended to be restrictive, but are merely illustrative of the larger number of possible combinations for the polyols used.

The hydroxyl number is defined as the number of milligrams of potassium hydroxide required for the complete hydrolysis of the fully phthalated derivative prepared from one gram of polyol. The hydroxyl number can also be defined by the equation:

$$OH = \frac{(56.1 \times 1000 \times f)}{m.w.}$$

where
OH = hydroxyl number of the polyol;
f = functionality, that is, average number of hydroxyl groups per molecule of polyol; and
m.w. = number average molecular weight of the polyol.

Substantially any of the polyols previously used in the art to make polyurethanes can be used as the polyol in this invention. Illustrative of the polyols useful in producing polyurethanes in accordance with this invention are the polyhydroxyalkanes, the polyoxyalkylene polyols or the like. Among the polyols which can be employed are those selected from one or more of the following classes of compositions, alone or in admixture, known to those skilled in the polyurethane art:

(a) alkylene oxide adducts of polyhydroxyalkanes;

(b) alkylene oxide adducts of nonreducing sugars and sugar derivatives;

(c) alkylene oxide adducts of phosphorus and polyphosphorus acids; and (d) alkylene oxide adducts of polyphenols.

Illustrative alkylene oxide adducts of polyhydroxyalkanes include, among others, the alkylene oxide adducts of glycerine; 1,2,4-trihydroxybutane; 1,2,6-trihydroxyhexane; 1,1,1-trimethylolethane; 1,1,1-trimethylolpropane; pentaerythritol; polycaprolactone; xylitol; arabitol; sorbitol; mannitol and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose; alkyl glycosides such as methyl glucoside; ethyl glucoside and the like; glycol glycosides such as ethylene glycol glucoside; propylene glycol glycoside; glycerol glucoside; 1,2,6-hexanetriol glucoside and the like, as well as the alkylene oxide adducts of the alkyl glycosides as set forth in U.S. Pat. No. 3,073,788, incorporated by reference herein.

A still further useful class of polyols is the polyphenols, and preferably the alkylene oxide adducts thereof wherein the alkylene oxides have from 2 to 4 carbon atoms. Among the polyphenols which are contemplated are, for example, condensation products of phenol and formaldehyde, and novolac resins; condensation products of various phenolic compounds and acrolein; the simplest member of this class being 1,2,3-tris(hydroxyphenyl)propane, condensation products of various phenolic compounds and glyoxal, glutaraldehyde, and other dialdehydes, the simplest members of this class being the 1,1,2,2-tetrakis(hydroxyphenol)ethanes and the like.

The alkylene oxide adducts of phosphorus and polyphosphorus acids are another useful class of polyols. Ethylene oxide; 1,2-epoxypropane; the epoxybutanes, 3-chloro-1,2-epoxypropane and the like are preferred alkylene oxides. Phosphoric acid, phosphorus acid, the polyphosphoric acids such as tripolyphosphoric acid, the polymeta phosphoric acids and the like are desirable for use in this connection.

Indeed, any material having an active hydrogen as determined by the Zerewitinoff test may be utilized as the polyol also known as "polyahls". For example, amine-terminated polyether polyols are known and may be utilized, if desired.

One class of preferred polyols employed in this invention include the poly(oxypropylene) glycols, triols and higher functionality polyols, and the like that are capped with ethylene oxide as dictated by the reactivity requirements of the particular polyurethane application. Generally, the nominal functionality of such polyols will be in the range of about 2.5 to 6 or more. These polyols also include poly(oxypropylene oxyethylene) polyols; however, desirably, the oxyethylene content should comprise less than 80 percent of the total polymer and preferably less than 60 percent. The ethylene oxide, when used, can be incorporated in any fashion along the polymer chain. Stated another way, the ethylene oxide can be incorporated either in internal blocks, as terminal blocks, or may be randomly distributed along the polyol chain. In total, the ethylene oxide content should most preferably be from 8 to 30 percent of the total polymer.

In addition to these conventional polyols, polymer polyols may be used alone or blended with other polyols. Polymer polyols are well known in the art. The basic patents in the field are Stammerer Re. 28,715 (reissue of U.S. Pat. No. 3,383,351); Re. 29,118 (reissue of U.S. Pat. No. 3,304,273); and the like, incorporated herein by reference. Such compositions can be produced by polymerizing one or more ethylenically unsaturated monomers dissolved or dispersed in a polyol in the presence of a free radical catalyst to form a stable dispersion of polymer particles in the polyol. These polymer polyol compositions have the valuable property of imparting to polyurethane foams produced therefrom higher load-bearing properties than are provided by the corresponding unmodified polyols. Also included are the polyols of the type taught in U.S. Pat. Nos. 3,325,421 and 4,374,209, incorporated herein by reference.

Conceptually, a wide variety of monomers may be utilized in the preparation of the polymer polyol compositions in accordance with the invention. Numerous ethylenically unsaturated monomers are disclosed in the prior patents. Any of these monomers should be suitable.

The selection of the monomer or monomers used will depend on considerations such as the relative cost of the monomers and the polyurethane product characteristics required for the intended application. To impart the desired load-bearing to the foams, the monomer or monomers used in preparing the polymer polyol should, of course, desirably be selected to provide a polymer which has a glass transition of at least slightly higher than room temperature. Exemplary monomers include styrene and its derivatives such as para-methylstyrene, methacrylates such as methyl methacrylate, acrylonitrile and other nitrile derivatives such as methacrylonitrile and the like.

It has been discovered that the method of this invention is particularly useful when the polymer polyol employs more than one ethylenically unsaturated monomer in producing the polymer polyol. Each monomer used in making the polymer polyol should be present in an amount of at least 5 wt. %, in some embodiments at least 10 wt. % or at least 15 wt. %, based on the total amount of ethylenically unsaturated monomers in the polymer polyol.

More than one monomer is desirable because using only one monomer often has disadvantages. For example, polymer polyols employing homopolymers of acrylonitrile frequently give polyurethane foams which are undesirably discolored. The use of styrene copolymerized with the acrylonitrile avoids the discoloration problem, but the stability of the polymer polyols (maintaining homogeneity during its shelf life) decreases with increasing styrene to acrylonitrile ratio. Thus, the use of styrene alone is not preferred.

The preferred monomer mixtures used to make the polymer polyol compositions are mixtures of acrylonitrile and styrene.

The monomer content will be typically selected to provide the desired solids content required for the anticipated end-use application. In general, it will usually be desirable to form the polymer polyols with as high a resulting polymer or solids content as will provide the desired viscosity and stability properties.

For typical high resilience (HR) foam formulations, solids content of up to about 45 weight percent or more are feasible and may be provided. It is preferred that the polyether polyol employed be a polymer polyol, particularly a polymer polyol formed by the in situ polymerization of a monomer in a polyether polyol, such as those mentioned above. In one embodiment, the polymer polyol is made in a polyether polyol having at least 70% primary hydroxyl groups (preferably at least 75% and most preferably at least 80%), a functionality of at least 2.5, and an ethylene oxide content of from about 8 to about 30% of the polyether polyol. The preferred monomers used are styrene and acrylonitrile.

It will be appreciated that mixtures of polyether polyols, mixtures of polyether polyols and polymer polyols and mixtures of polymer polyols may be employed in beneficial effect to producing the polyurethane foams of this invention.

Polyisocyanates

The organic polyisocyanates that are useful in producing the flexible polyurethanes foam in accordance with this invention are organic compounds that contain at least two isocyanato groups. Such compounds are well-known in the art. Suitable organic polyisocyanates include the hydrocarbon diisocyanates (e.g. the alkylene diisocyanates and the arylene diisocyanates), as well as known triisocyanates and polymethylene poly(phenylene isocyanates). Non-limiting examples of suitable polyisocyanates are 2,4-diisocyanatotoluene; 2,6-diisocyanatotoluene; methylene bis(4-cyclohexyl isocyanate); 1,8-diisocyanatooctane; 1,5-diisocyanato-2,2,4-trimethylpentane; 1,9-diisocyanatononane; 1,10-diisocyanatopropylether of 1,4-butylene glycol; 1,11- diisocyanatoundecane; 1,12-diisocyanatododecane bis-(isocyanatohexyl)sulfide; 1,4-diisocyanatobenzene; 3,5-diisocyanato-o-xylene; 4,6-diisocyanato-m-xylene; 2,6-diisocyanato-poxylene: 2,4-diiisocyanato-1-chlorobenzene; 2,4-diisocyanato-1-nitrobenzene; 2,5-diisocyanato-1-nitrobenzene; 4,4'-diphenylmethylene diisocyanate; 2,4'-diphenylmethylene diisocyanate: and polymethylene poly(phenyleneisocyanates) and mixtures thereof. The preferred polyisocyanates are TDI (a mixture of 80% 2,4-tolylene diisocyanate and 20% 2,6-tolylene diisocyanate), MDI (diphenylmethane diisocyanate alone or in mixture with its polymeric forms), and mixtures of TDI with MDI.

The isocyanate index for the polyurethane foams of this invention may range from about 50 to about 140, and is most preferably about 100.

Catalysts

Any known catalysts useful in producing polyurethanes may be employed in the processes and compositions herein. Representative catalysts include, but are not limited to:

(a) tertiary amines such as bis(2,2'-dimethylamino)ethylether, trimethylamine; triethylamine; N-methylmorpholine; N-ethylmorpholine; N,N-dimethylbenzylamine; N,N-dimethylethanolamine; N,N,N',N'-tetramethyl-1,3-butanediamine; N,N-dimethylpiperazine; triethylenediamine; pentamethyldipropylenetriamine, triethanolamine, pyridine oxide and the like;

(b) strong bases, such as alkali and alkaline earth metal hydroxides; alkoxides; and phenoxides;

(c) acidic metal salts of strong acids, such as ferric chloride; stannic chloride; stannous chloride; antimony trichloride; bismuth nitrate and chloride; and the like;

(d) chelates of various metals such as those which can be obtained from acetylacetone; benzoylacetone; trifluoroacetyl acetone; ethyl acetoacetate; salicyclaldehyde; cyclopentanone-1-carboxylate; acetylacetoimine; bis-acetylacetonealkylenediamine; salicylaldehydeimine; and the like, with various metals such as Be, Mg, Zn, Cd, Pd, Ti, Zr, Sn, As, Bi, Cr, Mo, Mn, Fe, Co, and Ni or such ions as $MoO_2++$, $UO_2++$ and the like;

(e) tertiary phosphines such as tfialkylphosphines; dialkylbenzylphosphines, and the like;

(f) alcoholates and phenolates of various metals, such as $Ti(OR)_4$; $Sn(OR)_4$; $Sn(OR)_2$; $Al(OR)_3$; and the like, wherein R is alkyl or aryl, and the reaction products of alcoholates with carboxylic acids, $\beta$-diketones, and 2-(N,N-dialkylamino)alcohols, such as the well known chelates of titanium obtained by said or equivalent procedures;

(g) salts of organic acids with a variety of metals, such as alkali metals, alkaline earth metals, Al, Sn, Pb, Mn, Co, Bi and Cu, including, for example, sodium acetate, potassium laurate, calcium hexanoate, stannous acetate, stannous octoate, stannous oleate, lead octoate, metallic driers such as manganese and cobalt naphthenate, and the like; and (h) organometallic derivatives of tetravalent tin, trivalent and pentavalent As, Sb, and Bi and metal carbonyls of iron and cobalt.

Among the organotin compounds that deserve particular mention are dialkyltin salts of carboxylic acids, e.g., dibutyltin diacetate, dibutyltin dilaureate, dibutyltin maleate, dilauryltin diacetate, dioctyltin diacetate, dibutyltin-bis(4-methylaminobenzoate), dibutyltindilaurylmercaptide, dibutyltin bis(6-methylaminocaproate), and the like. Similarly, there may be used a tfialkyltin hydroxide, dialkyltin oxide, dialkyltin dialkoxide, or dialkyltin dichlofide. Examples of these compounds include, but are not limited to, tfimethyltin hydroxide, tributyltin hydroxide, trioctyltin hydroxide, dibutyltin oxide, dioctyltin oxide, dilauryltin oxide, dibutyltin-bis-(isopropoxide), dibutyltin-bis(2-dimethylaminopentylate), dibutyltin dichlofide, dioctyltin dichlofide and the like.

The catalysts are employed in small amounts, for example, from about 0.001 percent to about 5 percent, based on the weight of the reaction mixture.

Chlorinated Alkanes

The chlorinated alkanes used to impart combustion resistance to the flexible HR polyurethane foams of the invention, and which improve their dynamic fatigue (durability) properties are typically made by chlofination of liquid alkane fractions and/or paraffin waxes. The chlorinated alkanes can have molecular weights of from about 350 to about 1400, and preferably from about 500 to about 800. The chlorine contents of suitable chlorinated alkanes may range from about 30 to about 70 percent by weight, preferably from about 40 to about 50 wt. %. The chlorinated alkanes can be liquids or solids; preferably the liquid chlorinated alkanes are employed in the foams of the present invention; liquid defined as flowing readily at room temperature, about 25° C. It is also preferred that the chlorinated alkanes be odor-free or substantially odor-free. Examples of commercially available chlorinated alkanes include, but are not limited to the Chlorowax ® chlorinated alkanes Nos. 40, 50 and 70 (Occidental Chemical Company).

As mentioned, the chlorinated alkane is the only additive used to impart combustion resistance to the inventive flexible HR polyurethane foam. It is used in a proportion of from about 1 to about 35 wt. % based on the weight of the polyol proportion, preferably in a proportion of about 2 to about 15 wt. %, most preferably from about 4 to about 10 wt. %.

It has been additionally discovered that the combination of a chlorinated alkane and a hydrophilic polyhydric compound synergistically improves processing in a way that is difficult to quantify, but which has been noticed by operators nonetheless. As noted, the addition of a chlorinated alkane delays the onset of gel. The use of a hydrophilic polyhydric compound such as glycerine delays the cream time; see U.S. Pat. No. 4,883,825, incorporated by reference herein. The combination of the two improves processing in a way either of them alone cannot achieve, and which cannot be described easily. Foams using glycerine as well are described below in Tables II and V. Materials besides glycerine which are suitable include, but are not necessarily limited to trimethylol propane, sorbitol, erythritol, sucrose, simple carbohydrates, and low molecular weight polyethylene oxide polyols which are reactive with isocyanate groups but are not more reactive with an isocyanate group than are the primary hydroxyl groups on the base polyols or polyether polyols described earlier. The proportions of hydrophilic polyhydric compound should range from about 0.1 to about 5.0 pphp polyol, preferably from about 0.5 to about 3.0 pphp.

Blowing Agents

A small amount of a blowing agent other than water may be employed in the reaction mixture, but may also be omitted. Water should be used in an amount from about 1 to 20, preferably 2 to 6 and most preferably 3 to 5, parts of water per hundred parts of polyol. A combination of water and other blowing agents may include halogenated hydrocarbons such as trichloromonofluoromethane; dichlorodifluoromethane; dichloromonofluoromethane; dichloromethane; trichloromethane; 1,1-dichloro-1-fluoroethane; 1,1,2-trichloro-1,2,2-trifluoroethane; hexafluorocyclobutane; octafluorocyclobutane, and the like. However, as noted, it is preferred in most embodiments to avoid the use of halocarbon blowing agents completely. Another class of blowing agents include thermally unstable compounds which liberate gases upon heating such as N,N'-dimethyl-N,N'-dinitrosoterephthalamide, amine formates, formic acid and the like. The quantity of blowing agent employed will vary with factors such as the density desired in the foamed product.

Stabilizers

It is also within the scope of the invention to employ, when applicable, small amounts, e.g. about 0.001 percent to 5.0 percent by weight, based on the total reaction mixture, of a foam stabilizer. Suitable foam stabilizers or surfactants are known and may vary depending upon the particular polyurethane application. A class of suitable copolymers includes those where the polysiloxane moiety is bonded to the polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer, with the remainder being polyoxyalkylene polymer. Yet another useful class of foam stabilizer is composed of the cyanoalkyl-polysiloxanes described in U.S. Pat. No. 3,905,924 useful as high resiliency (HR) foam stabilizers. Generally the stabilizers suitable for use in accordance with this invention will be referred to as silicone stabilizers.

Crosslinkers/Chain Extenders

Also useful, though optional, in the invention are crosslinkers/chain extenders. The proportion levels are in the range of 0.1 to 10 pphp of polyol, preferably 0.5 to 6.0 pphp polyol, and most preferably 1.5 to 3.5 pphp polyether polyol.

Suitable crosslinking/chain extending agents are those materials which are reactive with isocyanate groups, particularly compounds having hydroxyl and/or primary or secondary amine groups and include: (1) crosslinking compounds of an equivalent weight of less than about 200; and/or (2) difunctional extender compounds, other than those having only secondary hydroxyl groups, of equivalent weight of less than about 200. Preferably, the crosslinking/extending agent has a nominal functionality in the range of 2 to about 8.

A low molecular weight polyfunctional glycolamine crosslinking/extending agent is preferred to make foams under the conditions of this invention. Diethanolamine (DEOA) is the compound of choice. Blends of other crosslinkers and/or extenders with DEOA can also provide similar advantages.

Though DEOA is preferred, other crosslinking/extending agents such as, by way of non-limiting examples, triethanolamine; diisopropanolamine; ethylene glycol; butanediol; tetraethylenepentamine; polyethyleneimine; the isomers of phenylene diamine; glycerine; sorbitol; erythritol; sucrose; trimethylolpropane; pentaerythritol; 2,4,6-triaminotoluene; isophorone diamine; diethyl tolylenediamine; ethanolamine; hydrazine; 4,4-methylene-bis-(o-chloroaniline); low molecular weight alkylene oxide, e.g. ethylene oxide and propylene oxide adducts of polyfunctional amines or alcohols (e.g. polyfunctional glycols); alkylene oxide adducts of polyfunctional aminoalcohols and polyfunctional alcoholamines; amine-terminated polyalkylene oxides and many other low molecular weight polyfunctional hydroxyl and/or amine compounds can be substituted for DEOA, if desired.

Process/Foam Modifiers

Process/foam modifiers are optionally useful in this invention. These are materials which are derivatives of ethylene oxide and are used in the range of about 0.1 to 10 pphp of polyol, preferably about 0.2 to 5 pphp of polyol and most preferably from about 0.5 to 2 pphp polyol.

Polyethylene oxide monols and/or polyols are preferred process/foam modifiers. Suitable polyethylene oxide monol or polyols are those ethylene oxide adducts which contain greater than about 50% ethylene oxide, preferably greater than about 60%, and most preferably greater than about 75% by weight ethylene oxide, and have an equivalent weight ranging from about 150 to about 5000; preferably from 150 to about 1000; and most preferably from about 150 to about 700. The polyethylene oxide preferably has a hydroxyl functionality of two or greater.

Suitable initiators for the process/foam modifiers include, but are not necessarily limited to those discussed as suitable for the polyether polyols in the prior portion of this specification.

The modifier functions as a cell opening agent and modifies the foam reactivity and physical properties such as compression sets.

Other Additives

A variety of other additives known to those skilled in the art also may be incorporated in the foam formulations of the process of the present invention in accordance with techniques known in the art. These may include colorants, mineral fillers and other materials.

The polyurethanes so produced may be utilized in flexible foam applications where any otherwise conventional type of flexible polyurethane is or can be used. The polyurethanes find particular utility in the high resiliency foams for arm rests, automobile seats, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention, except as set forth in the appended claims. All parts and percentages are by weight unless otherwise indicated.

Definitions

As used in the Examples, the following designations, symbols, terms and abbreviations have the following meanings:

| | |
|---|---|
| Char Length | Length of sample charred according to Motor Vehicle Safety Standard No. 302; lower values are preferred; in units of inches. |
| 50% C.S. (CD) | Compression set test when foam compressed 50% using ASTM D-3574. CD refers to the constant deflection measurement technique. Similarly at 75%. |
| Density | Density in pounds per cubic foot (ASTM D-3574, Test A). |
| DEOA | Diethanolamine. |
| Elongation | Tested using ASTM D-3574. |
| H.A.C.S. | Humid aging compression set, 50%. (ASTM D-3574, Test D). |

| | |
|---|---|
| IFD 25% | Indentation Force Deflection, 25% (ASTM D-3574, Test B1 and Test B2), thickness given in inches. |
| IFD 65% | Indentation Force Deflection, 65% (ASTM D-3574, Test B1 and Test B2); IFD at 50% is similar. |
| IFD 65/25 Ratio | Indentation Force Deflection, 65% divided by Indentation Force Deflection, 25% (ASTM D-3574, Test B1 and Test B2). |
| M&T 120 | Dibutyltin dilaurylmercaptide catalyst sold by M&T Industries. |
| Niax A-1 catalyst | A catalyst solution consisting of 70 weight percent bis(2-dimethylaminoethyl)ether and 30 weight percent dipropylene glycol made by Union Carbide Chemicals and Plastics Corp. |
| Niax A-33 catalyst | A catalyst solution consisting of 33 weight percent triethylenediamine and 67 weight percent dipropylene glycol sold by Union Carbide Chemicals and Plastics Corp. |
| Polymer Polyol A | A polymer polyol which is a nominal triol based on propylene oxide and ethylene oxide. It contains about 18 wt. % polyoxyethylene and about 6 wt. % percent of polymer. Polymer polyol A has a hydroxyl number of about 33. This polymer polyol used both styrene and acrylonitrile as monomers, where each monomer was present in an amount of at least 5 wt. % based on the total monomers present. |
| Polymer Polyol B | A polymer polyol which is a nominal triol based on propylene oxide and ethylene oxide. It contains about 17 wt. % polyoxyethylene and about 13 wt. % percent of polymer. Polymer polyol B has a hydroxyl number of about 31. This polymer polyol used both styrene and acrylonitrile as monomers, where each monomer was present in an amount of at least 5 wt. % based on the total monomers present. |
| Porosity | Porosity in CFM (ASTM D-3574, Test G). |
| Resiliency | % Ball rebound. |
| TDI | A mixture of 80 wt. % 2,4-diisocyanatotoluene and 20 wt. % 2,6-diisocyanatotoluene. |
| Tear resistance (strength) | Tested using ASTM D-3574. |
| Tensile str. | Tensile strength tested using ASTM D-3574. |
| ACDF | ARCO Chemical Dynamic Fatigue rating; a measurement of durability, explained below. |
| Wet Set 50% | Japanese Industrial Standard (JIS) Test. |
| Y-10,515 | A silicone surfactant made by Union Carbide Chemicals and Plastics Corp. |

BENCH PROCEDURE

Prior to preparing the foaming mixture, it was necessary to prepare the mold properly. The molds used for this procedure were self-contained, air bag closure, aluminum molds (15"×15"×5"). Tempered water was provided by using an Advantage temperature controller which was set to maintain a mold temperature of 150° F. After the mold temperature was stabilized, the mold was sprayed with a commercial mold release (a wax in an organic solvent).

Each formulation was prepared by first mixing all of the ingredients except the TDI at 4000 rpm for 55 seconds. After mixing was stopped, the correct level of TDI was added quickly. Then the mixer was started and mixing continued at 4000 rpm for 5 seconds. After the mixing was completed, the contents of the mixing container were immediately poured into the waxed, 150° F. mold. The lid was immediately closed and latched and the air bag was inflated to quickly seal the mold. The mixture in the mold was allowed to foam and fill the mold. The mold was equipped with 1/16" vents on all four corners and some of the foam extruded through these vents thereby expelling the air in the mold. The foam was allowed to set in the mold for 3 to 5 minutes (depending on the formulation) until cured enough to allow demolding. The air bag was then deflated to relieve pressure in the mold and to allow declamping. The foam part was then removed, crushed by passing it through crushing rollers (90%) to open the foam cells and post cured for 30 minutes in a 250° F. forced air oven. The parts were then placed in a constant temperature (72° F.) constant humidity (50% R.H.) room and conditioned for 24 hours before testing for physical properties.

MACHINE PROCEDURE

The molded foams were prepared with an Admiral low pressure mixing machine as described in Table I. Two streams were fed to the foam mixing device at the prescribed rates. The first stream containing the polyol resin blend (all ingredients except the isocyanate) and the second stream containing the isocyanate were held at constant feed rates.

Liquid foam mixture was poured into an open aluminum mold 15"×15"×4". The mold lid was closed immediately thereafter. The finished molded cushion was removed 3 to 5 minutes later. The foams were crushed to 90% deflection three times after demolding. Then the foams were postcured for 30 minutes in an oven preset at 250° F., and foam physical properties were measured after a minimum of one day aging in a constant temperature (72° F.) constant humidity (50% R.H.) room.

TABLE I

High Resilience Molded Polyurethane Foam Process Conditions

| | |
|---|---|
| A. Machine | |
| Type | Admiral Low Pressure |
| Throughput, lbs/min. | 65 |
| Number of streams | 2 |
| Stream Temp., °F. (Resin/ISO) | 70/75 |
| B. Molding | |
| Mold Construction | Aluminum |
| Type Mold | 15" × 15" × 4" |
| Release Agent | Solvent based wax |
| Demold Temp., °F. | 150 |
| Wax Application Temp., °F. | 150 |
| Pour Temp., °F. | 150 |
| Demold Time, min. | 3–5 |
| Post-Cure | 30 min. at 250° F. |

ARCO Chemical Dynamic Fatigue (ACDF)—The ACDF apparatus and test were devised to measure the fatigue character of 15"×15"×4" (cut from 5") molded foam samples made by standard laboratory techniques. This test procedure measures creep in a dynamic mode, i.e. the change in mean deflection as the foam is deflected between two load limits. The load limits utilized are automatically determined 30 seconds into the test as the instantaneous loads then seen by the apparatus at 45% and 55% deflection. The test normally runs for 17 hours at a frequency of 5 hertz. The following data are obtained and utilized in calculating a dimensionless ACDF number:

1. Initial $IFD_{50}$
2. Final $IFD_{50}$
3. Initial Height
4. Final Height
5. Creep (% change in mean deflection during the test period)

The following arbitrary formula is used to define the ACDF rating.

$$ACDF = 5(HL) + 1.5(LL) + 4(C)$$

where:

HL is % height loss

LL is % load loss
C is % creep

Thus, the lower the ACDF number, the greater the resistance to fatigue. In an effort to obtain the volume of data required in a timely fashion, the ACDF test for these studies was shortened to two hours (ACDF-2). Earlier studies suggested that most of the change in the dynamic fatigue tests occurred within the first two hours, suggesting the validity of this approach; however, ACDF-2 ratings should not be directly compared to normal 17 hour ACDF ratings. All of the ACDF ratings provided herein are 17 hour tests.

Gel Data

ARCO Chemical uses a mechanized B B dropping apparatus that drops BB pellets at regular time intervals along a linear axis to determine gel rates. The B B drop is a test for measuring an empirical value, called gel, as a function of time during the polyurethane foaming reaction. What is actually measured is a complicated function of foam viscosity build, buoyancy effects and surface tension of the many cell membranes that are broken from the kinetic energy of BB impact. When percent gel is plotted as a function of time, sigmoidal-shaped curves are generated that are quite distinctive for a given type of foam system.

FIG. 1, a plot of % Gel as a function of time is created by calculating $T_n$ and % Gel values where:

$$\% \text{ Gel} = \frac{h_{BB}}{h_{foam}} \times 100$$

$$T_n = T_1 + \frac{(T_N - T_1)(n-1)}{(N-1)}$$

where
T = time in seconds
N = total number of BBs
n = number of current BB being measured
H = height
BB = BB pellet
$T_1$ = first BB time
$T_N$ = last BB time
$T_n$ = time of current BB (drop) being measured Tables II and III give the two basic formulations studied, absent the chlorinated alkane proportions, which are reported in Tables IV-VI along with the foam properties.

TABLE II

| Chlorowax 40 Study - 5.5 Water Formulation | |
|---|---|
| Components | Parts by Weight |
| Polymer Polyol A | 100.00 |
| Water | 5.50 |
| Diethanolamine | 0.60 |
| Glycerine | 0.75 |
| Niax catalyst A-1 | 0.18 |
| Niax catalyst A-33 | 0.35 |
| Union Carbide Silicone Y-10,515 | 1.20 |
| TDI index | 100 |

TABLE III

| Chlorowax 40 Study - 4.2 Water Formulation | |
|---|---|
| Components | Parts by Weight |
| Polymer polyol B | 100.00 |
| Water | 4.20 |
| Diethanolamine | 1.50 |
| Niax catalyst A-1 | 0.15 |
| Niax catalyst A-33 | 0.36 |
| M&T 120 | 0.005 |

TABLE III-continued

| Chlorowax 40 Study - 4.2 Water Formulation | |
|---|---|
| Components | Parts by Weight |
| Union Carbide Silicone Y-10,515 | 1.00 |
| TDI index | 100 |

TABLE IV

Low Pressure Foam Machine
Chlorowax 40 Study - 4.2 Water Formulation

| Example | 1 | 2 | 3 | 4 |
|---|---|---|---|---|
| Chlorowax 40 levels (pphp) | 0 | 2 | 4 | 6 |
| Density, pcf | 1.74 | 1.70 | 1.68 | 1.65 |
| Resiliency, % | 63 | 50 | 53 | 62 |
| Porosity | 10 | 25 | 28 | 31 |
| IFD, Thickness | 3.66 | 3.64 | 3.64 | 3.58 |
| 25% | 22 | 23 | 24 | 19 |
| 50% | 42 | 45 | 47 | 41 |
| 65% | 68 | 72 | 77 | 72 |
| IFD, 65/25 Ratio | 3.03 | 3.11 | 3.22 | 3.80 |
| Tensile | 24 | 21 | 22 | 22 |
| Elongation | 157 | 164 | 160 | 161 |
| Tear | 1.66 | 1.63 | 1.50 | 1.52 |
| Comp. Set, 50% | 15 | 13 | 12 | 13 |
| Comp. Set, 75% | 13 | 12 | 11 | 9 |
| HACS, 50% | 27 | 25 | 21 | 24 |
| Wet Set, 50% | 39 | 34 | 33 | 33 |
| Char Length, in. | 1.37 | 1.6 | 1.3 | 1.25 |
| ACDF | 102 | 85 | 81 | 66 |

TABLE V

Low Pressure Foam Machine
Chlorowax 40 Study - 5.5 Water Formulation

| Example | 5 | 6 | 7 | 8[1] |
|---|---|---|---|---|
| Chlorowax 40 levels (pphp) | 0 | 4 | 6 | 4 |
| Density, pcf | 1.46 | 1.45 | 1.49 | 1.48 |
| Resiliency, % | 37 | 40 | 51 | 44 |
| Porosity | 7 | 13 | 22 | 11 |
| IFD, Thickness | 3.43 | 3.44 | 3.46 | 3.48 |
| 25% | 15 | 15 | 15 | 16 |
| 50% | 30 | 30 | 30 | 32 |
| 65% | 49 | 49 | 49 | 52 |
| IFD, 65/25 Ratio | 3.26 | 3.27 | 3.30 | 3.27 |
| Tensile | 16 | 17 | 16 | 16 |
| Elongation | 138 | 140 | 142 | 122 |
| Tear | 1.12 | 1.16 | 1.16 | 1.45 |
| Comp. Set, 50% | 20 | 19 | — | — |
| Comp. Set, 75% | 20 | 16 | 13 | 13 |
| HACS, 50% | 36 | 30 | 25 | 29 |
| Wet Set, 50% | 41 | — | 39 | 43 |
| Char Length, in. | 2.3 | 0.98 | 0.92 | — |
| ACDF | 113 | 107 | 98 | — |

[1]Heat aged foam aged 45 days at 50° C.

TABLE VI

Bench Foams
Chlorowax 40 Study - 4.2 Water Formulation
(Polymer Polyol - Constant, Chlorowax 40
Substituted for Base Polyol)

| Example | 10 | 11 | 12 | 13 | 14 | 15 |
|---|---|---|---|---|---|---|
| Chlorowax 40 levels (pphp) | 0 | 4 | 8 | 12 | 14 | 16 |
| Density, pcf | 1.78 | 1.77 | 1.71 | 1.72 | — | — |
| Resiliency, % | 69 | 69 | 68 | 69 | 66 | 64 |
| Porosity | 25 | 33 | 21 | 35 | — | — |
| IFD, Thickness | 4.42 | 4.84 | 4.81 | 4.81 | 4.79 | 4.81 |
| 25% | 29 | 30 | 29 | 29 | 28 | 27 |
| 50% | 54 | 54 | 53 | 52 | 50 | 48 |
| 65% | 82 | 82 | 81 | 78 | 76 | 73 |
| IFD, 65/25 Ratio | 2.77 | 2.73 | 2.76 | 2.70 | 2.72 | 2.70 |
| Tensile | 22 | 22 | 21 | 22 | 21 | 21 |
| Elongation | 129 | 127 | 122 | 129 | 135 | 139 |
| Tear | 1.48 | 1.51 | 1.42 | 1.38 | 1.48 | 1.48 |

TABLE VI-continued

Bench Foams
Chlorowax 40 Study - 4.2 Water Formulation
(Polymer Polyol - Constant, Chlorowax 40
Substituted for Base Polyol)

| Example | 10 | 11 | 12 | 13 | 14 | 15 |
|---|---|---|---|---|---|---|
| Comp. Set, 50% | 8.95 | 7.69 | 7.68 | 7.46 | — | — |
| Comp. Set, 75% | — | — | — | — | — | — |
| HACS, 50% | 25.4 | 21.7 | 19.5 | 17.2 | — | — |
| Wet Set, 50% | 28.8 | 27.0 | 26.3 | 22.2 | — | — |
| Char Length, in., Ave. | 4.95 | 2.5 | 1.9 | 1.9 | 1.8 | 1.9 |

In nearly every case, the MVSS-302 char length values for foams employing a chlorinated alkane (Chlorowax 40) are less than those for the comparative values without the chlorinated alkane. Compare Examples 3, 4 and 5 (lengths 1.3, 1.25 and 1.12, respectively) with Example 1 having a length of 1.37, of Table IV. The difference is even more dramatic by comparing Examples 7 and 8 (lengths 0.98 and 0.92, respectively) with 2.3 for Example 6; and comparing Examples 11, 12, 3, 14 and 15 (2.5, 1.9, 1.9, 1.8 and 1.9, respectively) with that of Example 10 (4.95). The increase in char length of Example 2 is inconsistent with this trend and is considered an anomaly.

Surprisingly, the durability (Dynamic Fatigue) of the inventive foams containing the chlorinated alkanes is improved over that not employing the alkanes. For instance, in the Examples of Tables IV and V for which ACDF is measured, the ACDF values dropped by at least 5% and usually 10% or more over those values for the foams not containing the chlorinated alkanes.

FIG. 1 demonstrates that the gel rates of flexible polyurethane foams using a chlorinated alkane were not appreciably affected. Note that the three curves are similar in slope, once gel has begun. However, in every case, the onset of gel is delayed using the chlorinated alkanes, which delay is useful in preparing molded parts since it enables the components to be completely inserted into the mold and flow to the lowest places in the mold prior to the increasing of the viscosity of the foaming mixture caused by the gelling action of the components. As shown in FIG. 1, the onset of gel was increased from 38 seconds to 41 seconds, or about 8%. While 3 seconds may not seem like an important improvement, it is enough to give an important edge in filling the mold with the foam mixture, and thereby eliminating or significantly reducing air entrapment and/or shear collapse defects in the foam part. It is expected that the formulations of this invention will delay the onset of gel by about 5% in most cases.

It has been additionally surprisingly discovered that the formulations of this invention solve a problem resulting from the use of certain water-based mold release systems. It is well known that certain polyurethane foams which normally pass the MVSS-302 flammability test when prepared in molds treated with solvent-based mold release fail when prepared in molds treated with water-based mold release. This is a major problem for foam manufacturers who are required to use water-based mold release for environmental reasons. It has been discovered that the addition, to the foam mixture, of as little as 1 pphp of chlorinated alkanes such as described in this invention provides foam parts which will pass the FMVSS-302 test even when the foam is prepared in molds treated with water-based mold release.

Many modifications may be made in the flexible polyurethane foams of this invention without departing from the spirit and scope thereof, which are defined only in the appended claims. For example, the exact proportions and ingredients of the components of the formulation may be modified to optimize it for certain applications or mixtures of various chlorinated alkanes could be used to advantage.

We claim:

1. A process for the manufacture of a flexible polyurethane foam comprising reacting together:
    (a) a polymer polyol formed by polymerizing more than one ethylenically unsaturated monomer in a polyol, where each monomer is present in an amount of at least 5 wt. % based on total monomers present;
    (b) water;
    (c) an organic polyisocyanate;
    (d) at least one catalyst for the reaction of the polymer polyol and water with the organic polyisocyanate; and
    (e) a chlorinated alkane as the sole additive with any combustion resistance capability where onset of gel of the resulting flexible polyurethane foam is delayed as compared with an identical flexible polyurethane foam not containing the chlorinated alkane, and where the flexible polyurethane foam has improved durability and improved combustion resistance as compared with an identical polyurethane foam except that such latter foam contains no chlorinated alkane.

2. The process of claim 1 where the polymer polyol is formed in situ in a polyether polyol.

3. The process of claim 2 where the polymer polyol is formed in situ in a polyether polyol having at least 70% primary hydroxyl groups, a functionality of at least 2.5 and an ethylene oxide content of from 8 to 30% of the polyether polyol.

4. The process of claim 1 where the water is present in an amount from 1 to 20 parts per hundred parts (pphp) of polymer polyol.

5. The process of claim 1 where the chlorinated alkane is present in a proportion of 1 to 35 wt. %.

6. The process of claim 1 where the chlorinated alkane has a chlorine content from about 35 to about 70 wt. % and a molecular weight of between about 350 and 1400.

7. The process of claim 1 which is conducted in the absence of a polyvinylchloride resin and a transition metal oxide to improve combustion resistance.

8. The process of claim 1 further comprising reacting together with (a) and (b) with (c) as catalyzed by (d) in the presence of (e) and in the further presence of (f) a foam stabilizer.

9. The process of claim 1 where a hydrophilic polyhydric compound is additionally present which is selected from the group consisting of glycerine, trimethylol propane, sorbitol, erythritol, sucrose, simple carbohydrates, and low molecular weight polyethylene oxide polyols which are reactive with isocyanate groups but are not more reactive with an isocyanate group than are primary hydroxyl groups on (a) polyol.

10. A process for the manufacture of a flexible polyurethane foam comprising reacting together:
    (a) a polymer polyol formed by polymerizing more than one ethylenically unsaturated monomer in a polyol, where each monomer is present in an amount of at least 5 wt. % based on total monomers present;

(b) water in an amount from 1 to 20 pphp of the polymer polyol;

(c) an organic polyisocyanate;

(d) at least one catalyst for the reaction of the polymer polyol and water with the organic polyisocyanate; and (e) 1 to 35 wt. % of a chlorinated alkane as the sole additive with any combustion resistance capability in the absence of a polyvinylchloride resin and a transition metal oxide to improve combustion resistance, where onset of gel of the resulting flexible polyurethane foam is delayed as compared with an identical flexible polyurethane foam not containing the chlorinated alkane, and where the flexible polyurethane foam has improved durability and improved combustion resistance as compared with an identical polyurethane foam except that such latter foam contains no chlorinated alkane.

11. The process of claim 10 where the polymer polyol is formed in situ in a polyether polyol.

12. The process of claim 11 where the polymer polyol is formed in situ in a polyether polyol having at least 70% primary hydroxyl groups, a functionality of at least 2.5 and an ethylene oxide content of from 8 to 30% of the polyether polyol.

13. The process of claim 10 where the chlorinated alkane has a chlorine content from about 35 to about 70 wt. % and a molecular weight of between about 350 and 1400.

14. The process of claim 10 further comprising reacting together with (a) and (b) with (c) as catalyzed by (d) in the presence of (e) and in the further presence of (f) a foam stabilizer.

15. A flexible polyurethane foam made by the process comprising reacting together:

(a) a polymer polyol formed by polymerizing more than one ethylenically unsaturated monomer in a polyol, where each monomer is present in an amount of at least 5 wt. % based on total monomers present;

(b) water;

(c) an organic polyisocyanate;

(d) at least one catalyst for the reaction of the polymer polyol and water with the organic polyisocyanate; and (e) a chlorinated alkane as the sole additive with any combustion resistance capability where onset of gel of the resulting flexible polyurethane foam is delayed as compared with an identical flexible polyurethane foam not containing the chlorinated alkane, and where the flexible polyurethane foam has improved durability and improved combustion resistance as compared with an identical polyurethane foam except that such latter foam contains no chlorinated alkane.

16. The flexible polyurethane foam of claim 15 where the polymer polyol is formed in situ in a polyether polyol.

17. The flexible polyurethane foam of claim 16 where the polymer polyol is formed in situ in a polyether polyol having at least 70% primary hydroxyl groups, a functionality of at least 2.5 and an ethylene oxide content of from 8 to 30% of the polyether polyol.

18. The flexible polyurethane foam of claim 15 where the water is present in an amount from 1 to 20 parts per hundred parts (pphp) of polymer polyol.

19. The flexible polyurethane foam of claim 15 where the chlorinated alkane is present in a proportion of 1 to 35 wt. %.

20. The flexible polyurethane foam of claim 15 where the chlorinated alkane has a chlorine content from about 35 to about 70 wt. % and a molecular weight of between about 350 and 1400.

21. The flexible polyurethane foam of claim 15 where the foam has an absence of a polyvinylchloride resin and a transition metal oxide to improve combustion resistance.

22. The flexible polyurethane foam of claim 15 further comprising a foam stabilizer.

23. The flexible polyurethane foam of claim 15 where a hydrophilic polyhydric compound is additionally present which is selected from the group consisting of glycerine, trimethylol propane, sorbitol, erythritol, sucrose, simple carbohydrates, and low molecular weight polyethylene oxide polyols which are reactive with isocyanate groups but are not more reactive with an isocyanate group than are primary hydroxyl groups on (a) polyol.

24. A flexible polyurethane foam made by the process comprising reacting together:

(a) a polymer polyol formed by polymerizing more than one ethylenically unsaturated monomer in a polyol, where each monomer is present in an amount of at least 5 wt. % based on total monomers present;

(b) water in an amount from 1 to 20 pphp of polymer polyol;

(c) an organic polyisocyanate;

(d) at least one catalyst for the reaction of the polymer polyol and water with the organic polyisocyanate; and (e) 1 to 35 wt. % of a chlorinated alkane as the sole additive with any combustion resistance capability where onset of gel of the resulting flexible polyurethane foam is delayed as compared with an identical flexible polyurethane foam not containing the chlorinated alkane, and where the flexible polyurethane foam has improved durability and improved combustion resistance as compared with an identical polyurethane foam except that such latter foam contains no chlorinated alkane.

25. The flexible polyurethane foam of claim 24 where the polymer polyol is formed in situ in a polyether polyol.

26. The flexible polyurethane foam of claim 25 where the polymer polyol is formed in situ in a polyether polyol having at least 70% primary hydroxyl groups, a functionality of at least 2.5 and an ethylene oxide content of from 8 to 30% of the polyether polyol.

27. The flexible polyurethane foam of claim 24 where the chlorinated alkane has a chlorine content from about 35 to about 70 wt. % and a molecular weight of between about 350 and 1400.

28. The flexible polyurethane foam of claim 24 where the foam has an absence of a polyvinylchloride resin and a transition metal oxide to improve combustion resistance.

29. The flexible polyurethane foam of claim 24 further comprising a foam stabilizer.

30. A flexible polyurethane foam made by the process comprising reacting together:

(a) at least one polymer polyol formed by polymerizing more than one ethylenically unsaturated monomer in a polyol, where each monomer is present in an amount of at least 5 wt. % based on total monomers present, such polymer polyols as the only polyols;

(b) water in an amount from 1 to 20 pphp of the polymer polyol;

(c) an organic polyisocyanate;

(d) at least one catalyst for the reaction of the polymer polyol and water with the organic polyisocyanate; and (e) 1 to 35 wt. % of a chlorinated alkane as the sole additive with any combustion resistance capability, where onset of gel of the resulting flexible polyurethane foam is delayed as compared with an identical flexible polyurethane foam not containing the chlorinated alkane, and where the flexible polyurethane foam has improved durability and improved combustion resistance as compared with an identical polyurethane foam except that such latter foam contains no chlorinated alkane.

31. A process for delaying the onset of gel in the manufacture of a flexible polyurethane foam comprising reacting together:

(a) at least one polymer polyol formed by polymerizing more than one ethylenically unsaturated monomer in a polyol, where each monomer is present in an amount of at least 5 wt. % based on total monomers present, such polymer polyols as the only polyols;

(b) water;

(c) an organic polyisocyanate;

(d) at least one catalyst for the reaction of the polymer polyol and water with the organic polyisocyanate; and (e) a chlorinated alkane as the sole additive with any combustion resistance capability, where the onset of gel of the resulting flexible polyurethane foam is delayed as compared with an identical flexible polyurethane foam not containing the chlorinated alkane, and where the flexible polyurethane foam has improved durability and improved combustion resistance as compared with an identical polyurethane foam except that such latter foam contains no chlorinated alkane.

32. The process of claim 31 where the onset of gel is delayed by at least 5%.

* * * * *